Patented Oct. 15, 1929

1,731,679

UNITED STATES PATENT OFFICE

KURT H. MEYER, OF MANNHEIM, JOHANNES MÜLLER, OF EPPSTEIN, AND ULRICH HOFFMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SOFTENING PAPER

No Drawing. Application filed January 7, 1928, Serial No. 245,260, and in Germany January 7, 1927.

This invention relates to improvements in softening paper, in particular parchment paper.

We have found that paper, in particular parchment paper, is softened in an excellent manner by being passed through a bath containing sorbitol which may also be present in the form of its dehydration products obtainable according to the process of the application for patent Ser. No. 245,256, filed Jan. 7, 1928, or in the form of the products obtainable by the action of chemical agents on sorbitol or its dehydration products or mixtures of these substances. The said bath may also contain other substances, such as other polyvalent alcohols, for example glycerol or glycol, or sodium lactate, or inorganic hygroscopic salts.

Sorbitol or its derivatives may of course be incorporated with the paper at any stage of its manufacture, for example, it may already be admixed with the paper pulp.

The softening action of the sorbitol or its derivatives is due to its hygroscopic properties, since the paper which has been treated therewith, always retains a certain amount of moisture, although the paper does not become in the least sticky.

Sorbitol and its derivatives also possess the advantage of making the paper heavier. They have the further advantage of being colorless, odorless and non-poisonous and the papers treated therewith are thus very suitable for packing foodstuffs. Such papers show no tendency to break on creasing.

The following examples further illustrate the nature of the said invention, but the invention is not limited thereto. The parts are by weight.

Example 1

Paper which has just been parchmentized with sulfuric acid, is washed with water and when entirely free from acid is passed through a bath containing 1 part of sorbitol in 5 parts of water. The paper is then passed through rubber rollers. An excellent soft parchment paper, proof against fat is thus obtained, which is very suitable for wrapping up foodstuffs.

In the above example the dehydration product of sorbitol obtainable according to the aforesaid application for patent Ser. No. 245,256, filed Jan. 7, 1928, may be substituted wholly or in part for sorbitol.

Example 2

An excellent softening composition for paper is obtained by mixing 55 parts of sorbitol, 15 parts of glycerol and 30 parts of water.

The said softening composition may be employed as described in Example 1 on dilution with 5 parts of water for 1 part of the composition.

Example 3

A mixture of 60 parts of the dehydration products of sorbitol, 10 parts of glycol and 30 parts of water furnishes an excellent softening composition for paper and may be employed in dilution with water as described in Example 1.

Example 4

50 parts of sorbitol are mixed with 20 parts of sodium lactate and 30 parts of water. An excellent softening composition for paper is thus obtained.

Example 5

An excellent softening agent for paper is produced by dissolving 100 parts of sorbitol, 24 parts of glycerol, 6 parts of calcium chlorid, 2 parts of calcium acetate and 4 parts of sodium chlorid in 632 parts of water.

What we claim is:

1. As a new article of manufacture, softened paper comprising paper and sorbitol.

2. As a new article of manufacture softened parchment paper comprising parchment paper and sorbitol.

In testimony whereof we have hereunto set our hands.

KURT H. MEYER.
JOHANNES MÜLLER.
ULRICH HOFFMANN.